United States Patent [19]

Nagata

[11] 4,197,986

[45] Apr. 15, 1980

[54] MONEY TRANSACTION SYSTEM

[75] Inventor: Masanori Nagata, Nagaokakyo, Japan

[73] Assignee: Omron Tateisi Electronics Co., Kyoto, Japan

[21] Appl. No.: 901,158

[22] Filed: Apr. 28, 1978

[30] Foreign Application Priority Data

Apr. 28, 1977 [JP] Japan .................... 52-49375

[51] Int. Cl.² .................. G06F 15/30; H04Q 3/48
[52] U.S. Cl. .................. 235/379; 340/149 A
[58] Field of Search ............. 235/379, 380, 381, 382; 340/149 A, 152; 250/569; 194/4 F; 221/92

[56] References Cited

U.S. PATENT DOCUMENTS

| | | | |
|---|---|---|---|
| 3,891,830 | 6/1975 | Goldman | 235/380 |
| 3,949,364 | 4/1976 | Clark | 340/149 A |
| 3,982,103 | 9/1976 | Goldman | 340/149 A |
| 4,004,134 | 1/1977 | Hwang | 235/431 |
| 4,114,027 | 9/1978 | Slater | 340/149 A |

*Primary Examiner*—Robert M. Kilgore
*Attorney, Agent, or Firm*—Sughrue, Rothwell, Mion, Zinn and Macpeak

[57] ABSTRACT

A transaction system comprising a card having a card balance recorded therein, at least one terminal transaction processor operable on the basis of on-line and off-line computer schemes, and a center operatively associated with the terminal transaction processor and having a file for recording thereon data corresponding to the card balance recorded on the card. Not only when the terminal processor is operating on the basis of the on-line computer scheme, but also when the terminal processor is operating on the basis of the off-line computer scheme, withdrawal or deposit of money can be effected within the framework of a maximum purchase amount. Each time such transaction has been made, the card balance is updated to read a new card balance.

9 Claims, 11 Drawing Figures

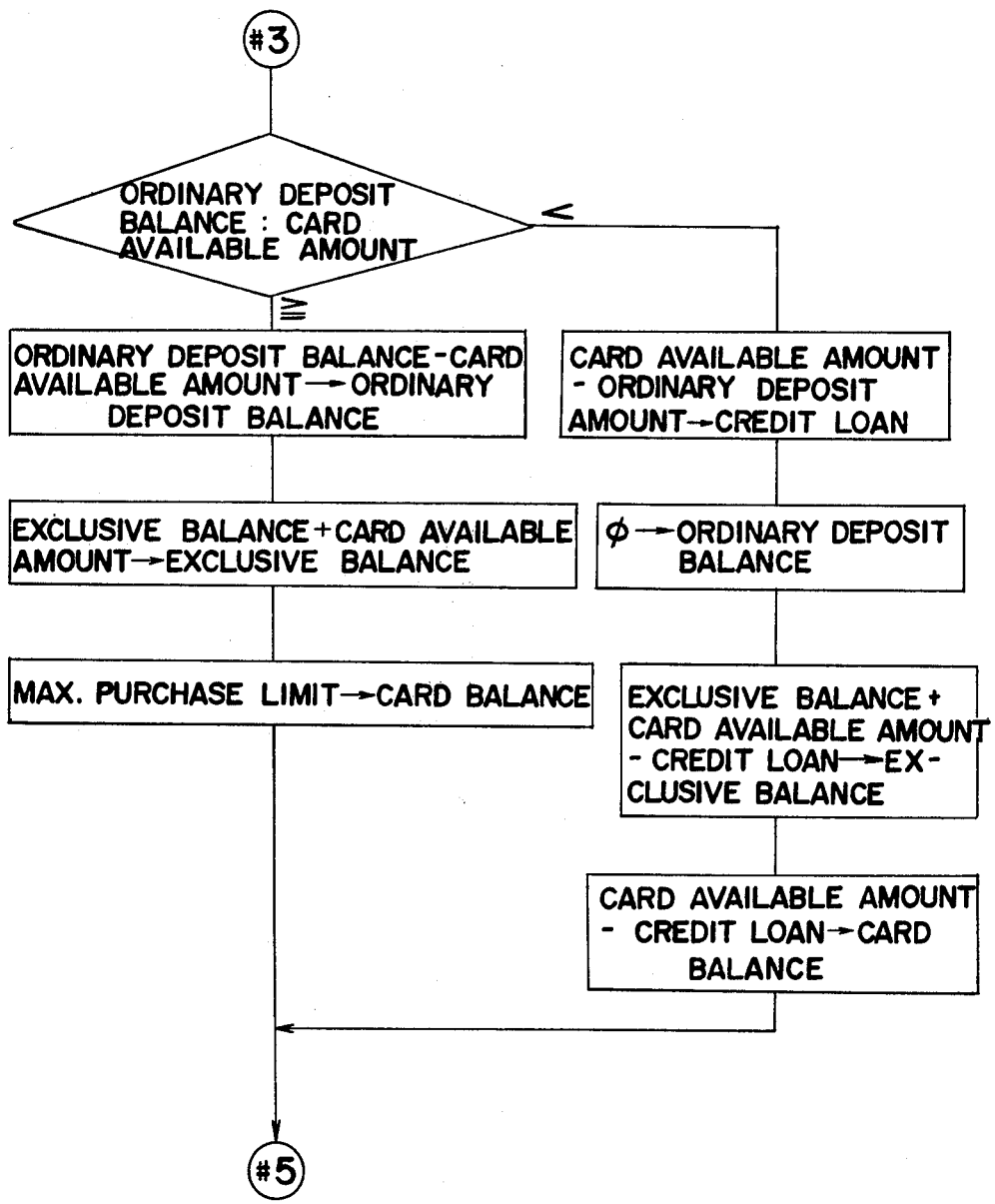

MONEY TRANSACTION SYSTEM

The present invention generally relates to a transaction system and, more particularly, to a credit card system wherein withdrawal and deposit of money can be made by the use of a credit card, it being to be understood that the term "credit card" hereinbefore and hereinafter employed is intended to include a cash card.

Two types of transaction processors are currently used, which operate on the basis of the "on-line" and "off-line" computer schemes, respectively. In addition, there is also currently used a transaction processor of a type which normally operates on the basis of the "on-line" computer scheme, but can be switched over to operate on the basis of the "off-line" computer scheme during the early morning and the later evening.

The present invention pertains to the transaction system wherein a single credit card associated with a single account can be used in transaction with any one of on-line and off-line computer facilities.

According to a conventional transaction system of similar kind, the credit balance data stored in the credit card is updated only after a sale involving the on-line computer scheme has been completed. Where the sale involving the on-line computer scheme is not successful, the credit balance data are not updated and, therefore, the deposited money cannot be withdrawn because of insufficient balance against the purchase amount when the customer subsequently attempts to withdraw the deposited money, thereby providing an inconvenience to the customer.

Accordingly, the present invention has been developed with the view to substantially eliminating the above mentioned inconvenience and is intended to provide an improved transaction system wherein a single credit card associated with a single account can be used in transaction with any one of on-line and off-line computer facilities.

Another object of the present invention is to provide an improved transaction system wherein withdrawal of a purchase amount is possible, within the framework of a maximum purchase limit, from a transaction processor when the latter is operating on the basis of off-line scheme.

A further object of the present invention is to provide an improved transaction system wherein the card balance can be updated even if deposit or withdrawal of money does not take place during the on-line operating scheme.

A still further object of the present invention is to provide an improved transaction system wherein the card balance can be updated to render it to be equal to the maximum purchase amount.

A still further object of the present invention is to provide an improved transaction system wherein there is provided means for updating the card balance to render the latter to be equal to the maximum purchase amount prior to the actual transaction taking place.

A still further object of the present invention is to provide an improved transaction system wherein the updating of the card balance is carried by operating a manual input key means associated with a balance quotation or card balance updating.

For better understanding of the present invention, the present invention will be described in conjunction with a preferred embodiment thereof with reference to the accompanying drawings, in which:

FIG. 7 is a program chart showing process steps performed by a center during on-line transaction.

Figure 1:
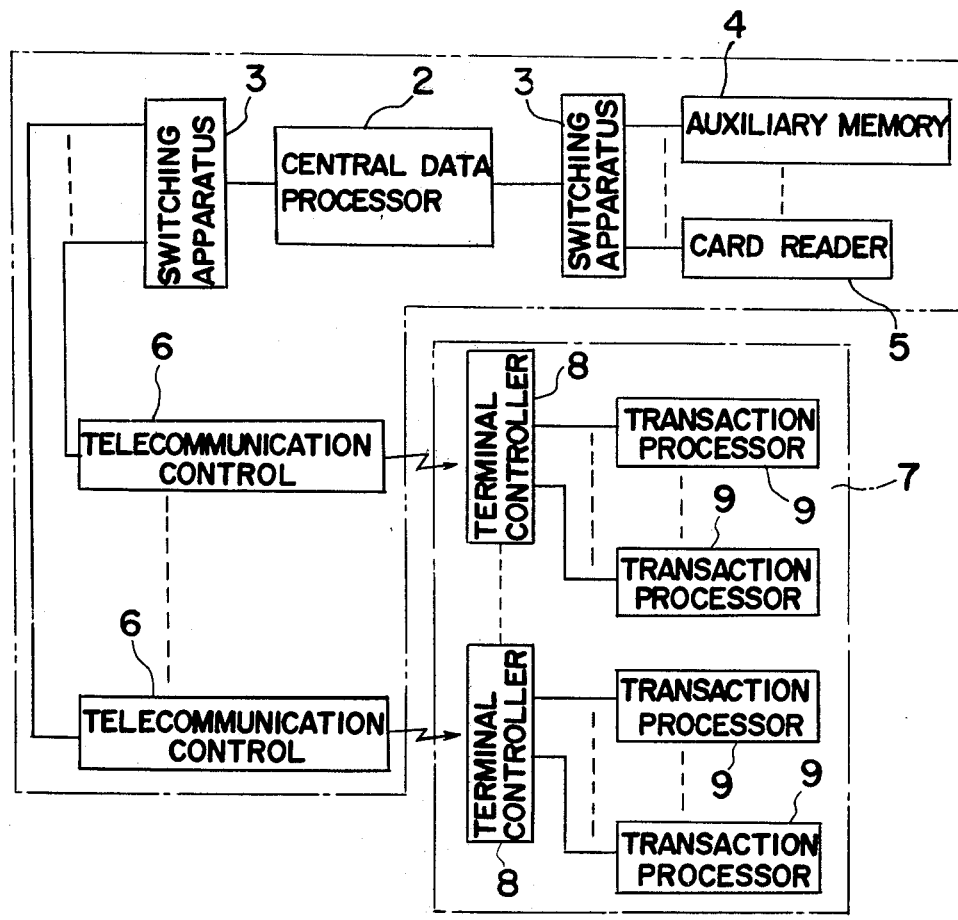
FIG. 1 is a block diagram of a credit card data processing system according to the present invention.

Referring to the drawings, FIG. 1 illustrates a block diagram of a credit card data processing system which comprises a center 1 including a central data processor 2 which constitutes a principal component of the center 1. The center 1 further includes a switching apparatus 3 and an auxiliary memory device 4 which may be constituted by a magnetic disc memory or a magnetic drum memory. Although not shown, a line printer and a punched tape reader are to be understood as electrically connected to the switching apparatus 3. The central data processor 2 is operable to control any one of terminal devices, two of which are shown by 7 in FIG. 1, through the switching apparatus 3 by way of a telecommunication control 6 according to the Pauling scheme, it being understood that the terminal devices 7 are located at respective branch offices of a bank separate from its headquarter office. The telecommunication control 6 is connected to any one of the terminal devices 7 through data transmission lines. Any one of the terminal devices 7 includes a terminal controller 8 and one or more transaction processors 9 such as a cash dispensing machine or a cash depositing machine.

In the following description of the present invention, the credit card data processing system will be described as associated with the case wherein the transaction processor 9 is constituted by a cash dispensing machine.

Figure 2:
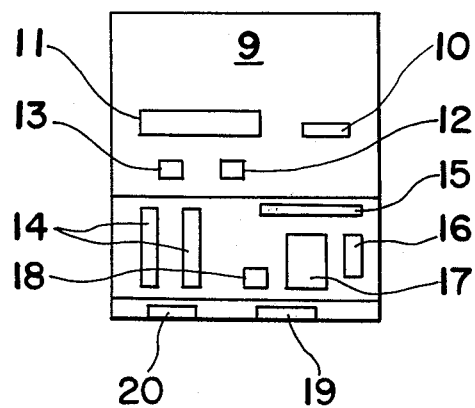
FIG. 2 is a schematic front elevational view of a cash dispensing machine.

FIG. 2 illustrates various arrangements on a front control panel of the cash dispensing machine 9. The front control panel of the cash dispensing machine 9 is shown to have a card inserting and ejecting slot 10, a handling procedure display 11, a check switch 12, a call switch 13 for, when actuated, calling a bank clerk, and a pair of parallel windows 14 through which a customer can confirm the number of bank notes of one kind and the number of bank notes of another kind, respectively, which are dispensed. The front control panel of the cash dispensing machine 9 further has a digital input display 15 where any one of the customer's secret code and the purchase amount can be displayed as inputted through a keyboard 17, an auxiliary keyboard 16 for designating the unit of money amounting to the purchase amount, a balance quotation key 18, a sale slip discharge slot 19 and a cash dispensing slot 20.

Figure 3:
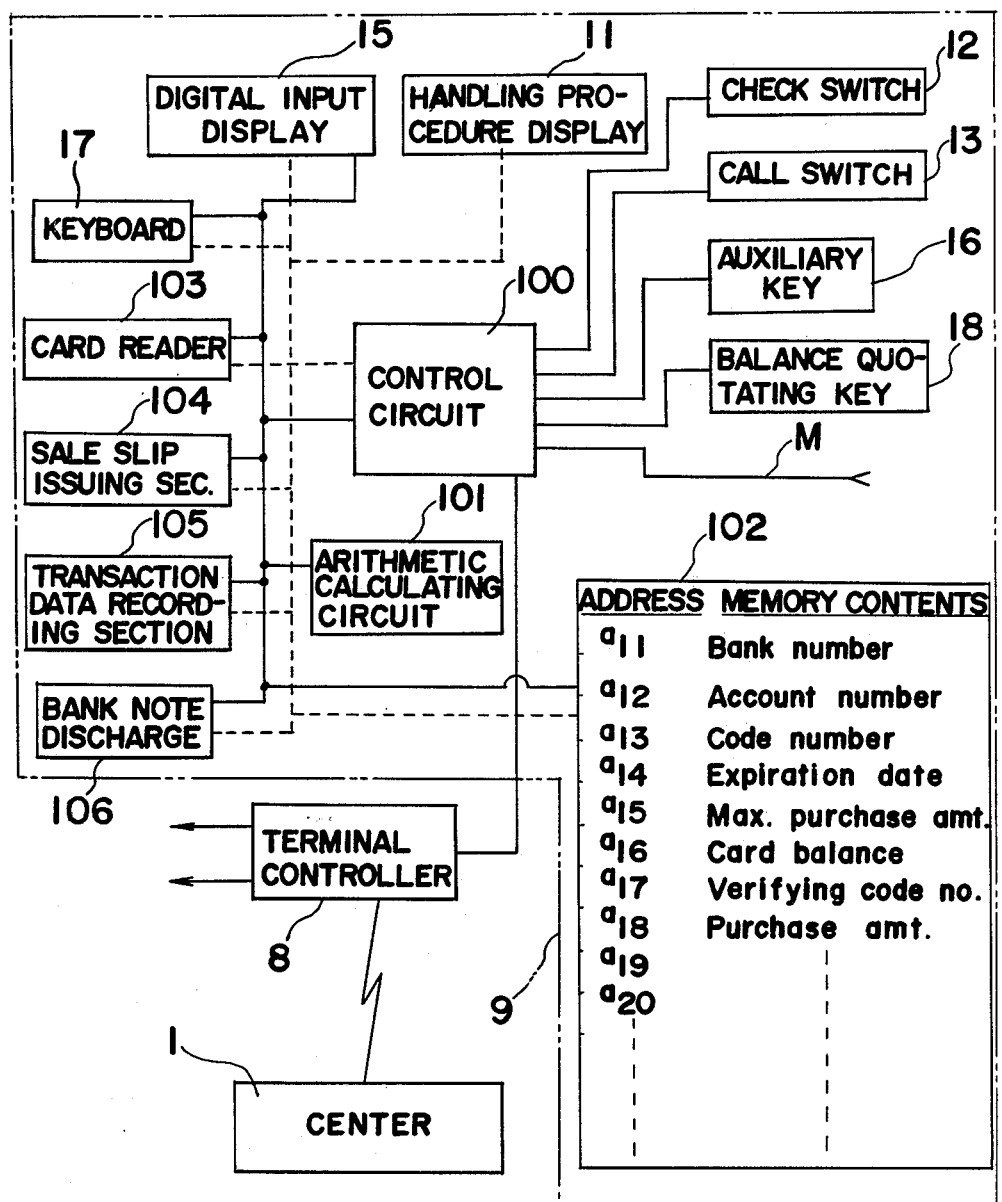
FIG. 3 is a block diagram of the cash dispensing machine.
Figure 4:
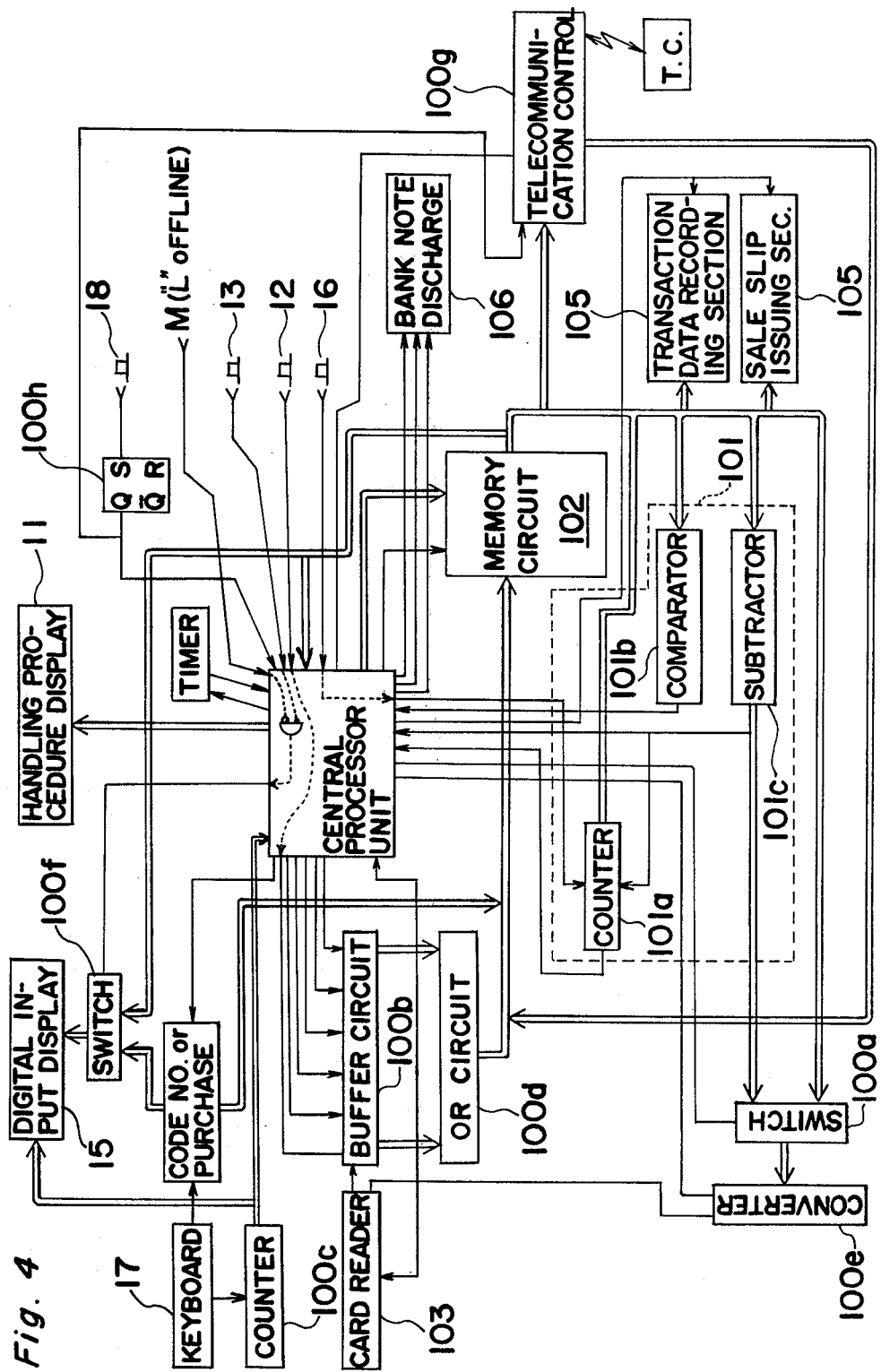
FIG. 4 is a block diagram showing the details of the cash dispensing machine shown in FIG. 3.

The cash dispensing machine 9 referred to above comprises, as shown in FIG. 3, a control circuit 100, an arithmetic calculating circuit 101 and a memory circuit 102, all of which constitute an ordinary micro-computer system, the details of which are best shown in FIG. 4. The machine 9 further comprises a card reader 103, a sale slip issuing section 104, a transaction data recording section 105, and a cash dispensing section 106. It is to be noted that other components of the cash dispensing machine 9 shown in FIGS. 3 and 4 are designated by like reference numerals employed to refer to like components shown in FIGS. 1 and 2.

In FIG. 3, broken lines represent respective control lines while solid lines represent respective data lines and it will readily be seen that all of the components of the cash dispensing machine 9 function under the control of the control circuit 100.

In FIG. 4, the control circuit 100 is shown to include a central processing unit CPU, a switching circuit 100a, a buffer circuit 100b, a counter 100c, an OR circuit 100d, a parallel-series converter 100e, a second switching circuit 100f, a telecommunication control 100g and a flip-flop 100f. On the other hand, the arithmetic calculating circuit 101 is shown to include a counter 101a, a comparator 101b and a subtractor 101c.

The transaction system according to the present invention will now be described with particular reference to FIGS. 5 to 6.

Figure 5:
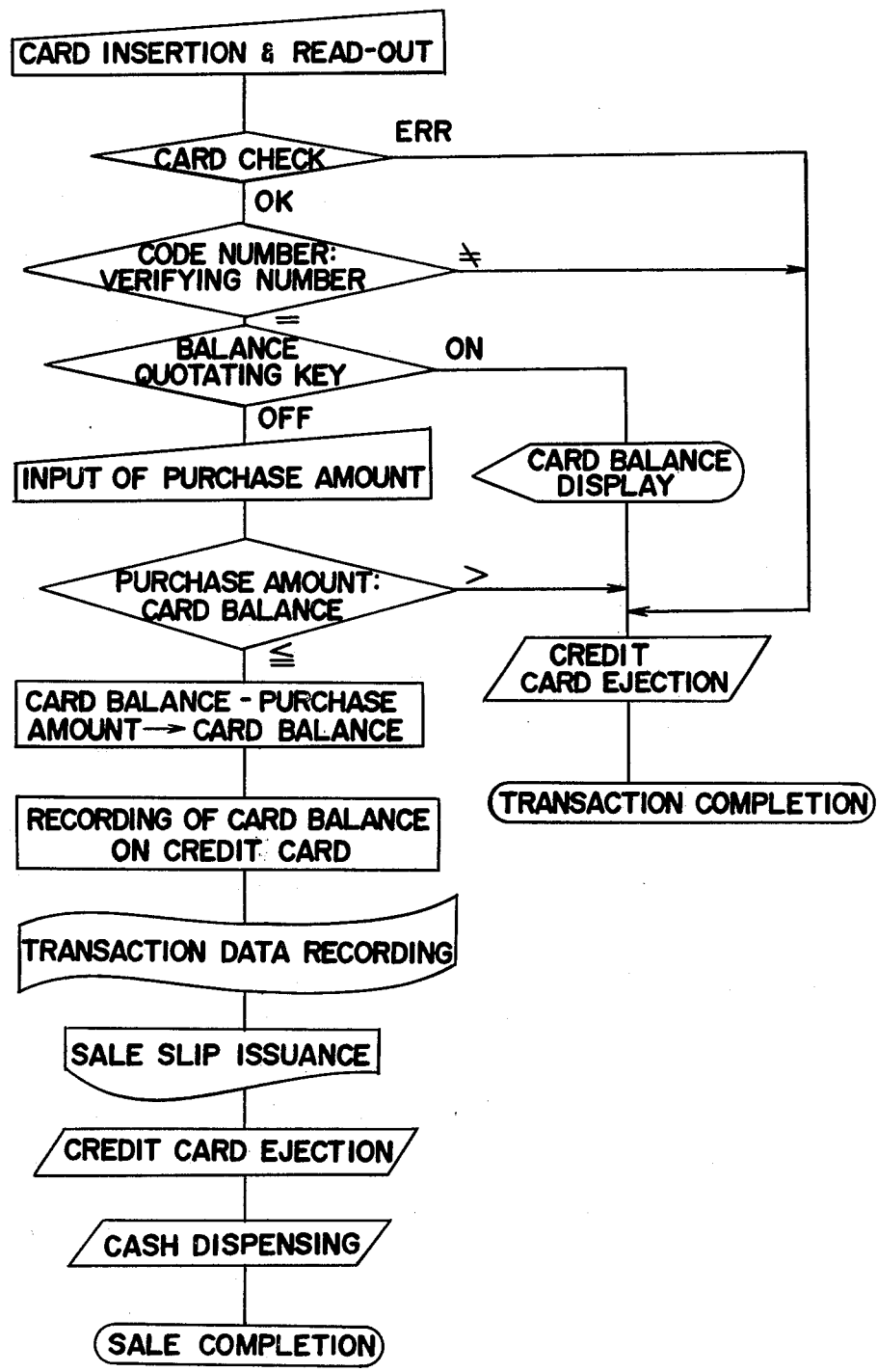
FIG. 5 is a program chart showing process steps performed by the cash dispensing machine during off-line transaction.

FIG. 5 shows a program chart performed by the cash dispensing machine 9 during an off-line transaction scheme. It is to be noted that the cash dispensing machine 9 shown in FIG. 3 is of a type capable of operating on the basis of both on-line and off-line schemes, it being understood that the machine 9 operates on the basis of the on-line scheme so long as a mode signal M is inputted to the control circuit 100.

Assuming that a customer inserts his credit card into the card inserting and ejecting slot 10, the card reader 103 reads the data stored in the credit card. This card data read out by the reader 103 are encoded by the arithmetic calculating circuit 101 under the control of the control circuit 100 and then stored in the memory circuit 102. In other words, the bank number, the account number, the verifying code number, the date of expiration of the availability of the credit card, the maximum purchase limit and the credit balance stored in the card are stored at respective addresses $a_{11}$, $a_{12}$ . . . $a_{15}$ and $a_{16}$ of the memory circuit 102 as shown in FIG. 3. It is to be noted that, during the off-line transaction scheme, the maximum purchase limit may not be read out.

Subsequent thereto, a card check is made to verify the acceptability of the inserted card to the cash dispensing machine 9 and the identification of the customer who has inserted the card into the cash dispensing machine 9. In other words, the bank number, the account number and the date of expiration of the availability of the credit card are checked. In any event, since the details of this card check are well known to those skilled in the art, they will not be described for the sake of brevity. Thereafter, the customer's code number inputted through the keyboard 17 and stored at the address $a_{17}$ of the memory circuit 102 is compared with the verifying code number stored at the address $a_{13}$ of the memory circuit 102 and, if an error occurs, that is, when the customer's code number is verified not to coincide with the verifying code number, this fact is displayed through the handling procedure display 11 while the credit card inserted is ejected and returned to the customer.

However, when and after the customer's code number has been verified as coinciding with the verifying code number, a check is made as to whether or not the balance quotation key 18 is depressed. Where the balance quotation key 18 is depressed, the card balance stored at the address $a_{16}$ of the memory circuit 102 is displayed through the digital input display 15 and, thereafter, the credit card inserted is returned to the customer to complete the transaction.

On the other hand, where the balance quotation key 18 is not depressed, but the purchase amount is inputted by manipulating the keyboard 17, which is the case where the customer intends to withdraw money from his account, the purchase amount is temporarily stored at the address $a_{18}$ of the memory circuit 102 which is subsequently compared with the card balance stored at the address $a_{16}$ of the memory circuit 102. If the result is such that the purchase amount is higher than the card balance, the sale is terminated and the credit card inserted is returned to the customer.

However, if the result is such that the purchase amount is equal to or lower than the card balance, the purchase amount is automatically subtracted from the card balance and a new balance is stored at the address $a_{16}$ of the memory circuit 102 and also at an appropriate location on the credit card.

Simultaneously therewith, the transaction data are recorded in the transaction data recording section 105 and a sale slip imprinted with the recorded transaction data is issued through the sale slip issuing section 104 against the customer. A recording medium in the transaction data recording section 105 is constituted by, for example, a magnetic tape or a punched paper tape, and, therefore, the recorded transaction data may constitute input data to be inputted to the center 1 on the basis of a batch operation. Alternatively, where the cash dispensing machine is of a type capable of operating on the basis of both on-line and off-line schemes, such as employed in the illustrated embodiment of the present invention, the transaction data may be recorded in magnetic memory cores or a magnetic disc memory during an off-line transaction and may subsequently be transmitted to the center 1 during an on-line transaction.

Subsequent to the sale slip issuance, the credit card inserted into the cash dispensing machine 9 is returned to the customer through the card inserting and ejecting slot 10 and, thereafter, the cash dispensing section 106 dispenses bank notes, amounting to the purchase amount stored at the address $a_{18}$ of the memory circuit 102, towards the parallel windows 15. After the customer looking at the parallel windows 15 has confirmed that the bank notes dispensed towards the windows 15 amount to the purchase amount and subsequently actuated the check switch 12, the bank notes can be discharged towards the outside of the dispensing machine 9 through the cash dispensing slot 20 together with the sale slip discharged through the sale slip discharge slot 19. Where the amount of the bank notes does not coincide with the purchase amount, what the customer should do is to press the call switch 13 to call the bank clerk. In addition, by manipulating the auxiliary keyboard 16, the bank notes can be dispensed in different units of money and different number of bank notes for each unit of money. Thereafter, the sale transaction based on the off-line scheme is terminated.

The cash dispensing machine 9 operates in the following manner, and in the manner shown in FIG. 5, during an on-line transaction scheme, which will now be described with reference to FIG. 6. However, it is to be noted that even during the on-line transaction scheme, the cash dispensing machine 9 performs the process steps in a manner similar to that during the off-line transaction scheme up to the step of comparing the customer's code number with the verifying code number, i.e., up to the code verification step.

Figure 6A:
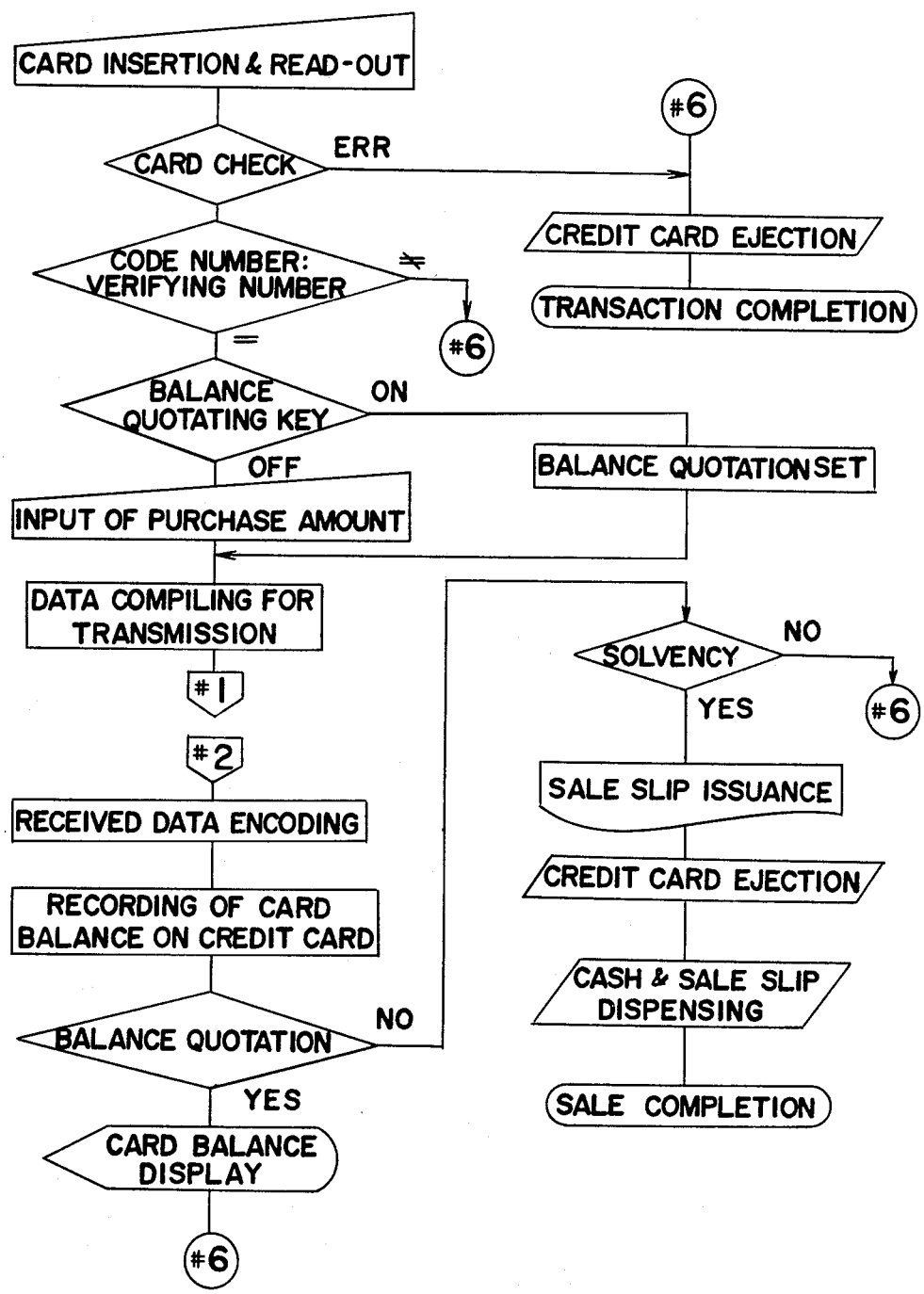
FIG. 6 is a program chart showing process steps performed by the cash dispensing machine during on-line transaction, FIG. 6 being divided into FIGS. 6(a) and (b)
Figure 6B:
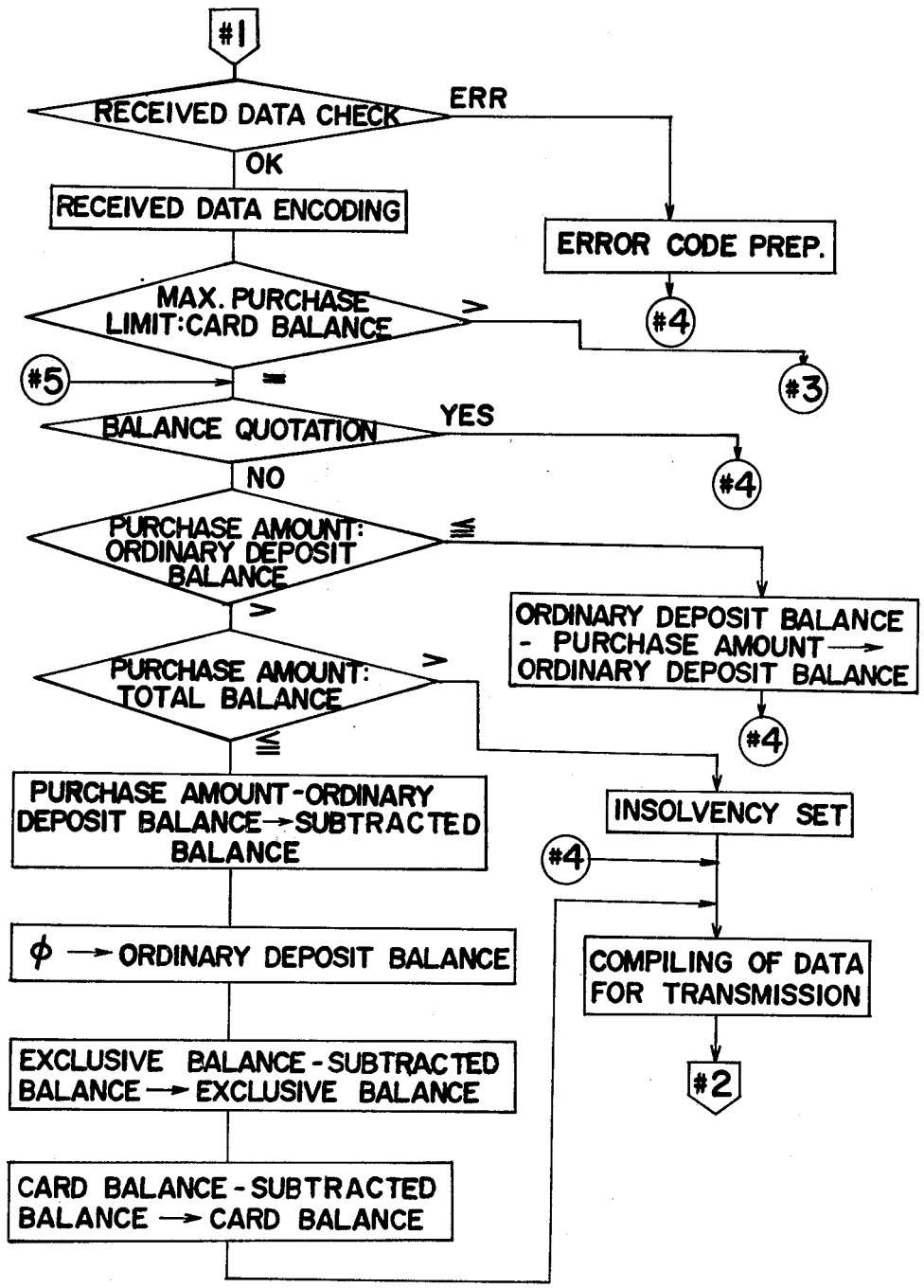

Referring to FIG. 6, subsequent to the code verification step, the check is made as to whether or not the balance quotation key 18 is depressed. Where the balance quotation key 18 is depressed by the customer, a balance quotation bit, which means a predetermined bit contained in the data being transmitted, is set to compile the data to be transmitted. On the contrary thereto, where the balance quotation key 18 is not depressed, but the purchase amount is inputted by manipulating the keyboard 17, compiling of the data to be transmitted is started simultaneously with the input of the purchase amount by the manipulation of the keyboard 17. What constitute the data to be transmitted are the serial number of the cash dispensing machine being utilized, the bank number, the account number, the maximum purchase limit, the card balance and the balance quotation bit, which may be "1" where the balance inquiry is made and "0" where the withdrawal of money is intended, the purchase amount, STX and ETX.

It is to be noted that the terms "maximum purchase limit" and "card balance" referred to above and hereinafter are to be understood as meaning as follows:

Maximum purchase limit: This term is intended to mean the maximum amount of money a particular customer can withdraw from the cash dispensing machine during the off-line transaction scheme. This maximum amount may either be fixed for all customers or vary from customer to customer depending upon the balance a particular customer has in his bank account. Alternatively, it may be fixed upon request made by a particular customer in consideration of the total amount deposited in his ordinary deposit account while the remainder, i.e., the difference between the total amount deposited and the maximum purchase limit so fixed, is treated as an ordinary deposit balance.

Card balance: This term is intended to mean the amount of the maximum purchase limit less the purchase amount. This card balance is fixed to a certain value during an on-line transaction scheme, and the purchase amount is subtracted from this card balance each time a sale is made during the on-line transaction scheme.

After the cash dispensing machine 9 has compiled the above described data to be transmitted, the cash dispensing machine 9 starts transmitting such data to the center 1 immediately after the center 1 has been polled for such cash dispensing machine 9. It is to be noted that, in FIGS. 5 and 6, pentagonal blocks employed therein illustrate that the cash dispensing machine 9 is telecommunicated with the center 1 through the terminal controller 8.

The center 1, after having received and checked the data transmitted thereto from the cash dispensing machine 9, encodes the transmitted data so that a data file associated with the particular account can be read from the auxiliary memory device 4 into a principle memory in the central data processor 2. At this time, checks are also made as to whether such account is present or absent and whether or not such account is valid. Where an error is indicated, an error code is prepared and transmitted back to the cash dispensing machine 9.

The data file referred to above may include such data as the bank number, the account number, the ordinary deposit balance, information concerning a fixed deposit, the exclusive balance as hereinafter defined, and CIF information. In addition thereto, the data file may also contain the maximum purchase limit and the verifying code.

The term "exclusive balance" referred to above is intended to mean the card balance managed on the side of the center 1. Ordinarily, the exclusive balance must be equal to the card balance, but since the data established during the off-line transaction scheme involve a delay due to the batch operation and since the exclusive balance, therefore, becomes higher than the card balance, the center 1 stores such an exclusive balance separately of the card balance.

Comparison is then made between the maximum purchase limit and the card balance. Where the result of such comparison shows that the maximum purchase limit is equal to the card balance, which shows that the previous transaction has been based on an on-line transaction scheme, the center 1 proceeds to the step #5. On the contrary thereto, where the maximum purchase limit is greater than the card balance, it may indicate that the previous transaction has been made on either the on-line transaction scheme or the off-line transaction scheme.

In the embodiment of the present invention, the maximum amount of money the customer can withdraw is equal to the sum of the ordinary deposit balance and the card balance. In addition, although withdrawal from the card balance may be possible during the off-line transaction scheme, arrangement is made such that withdrawal can be made from the ordinary deposit balance and, only when the ordinary deposit balance is consumed, a subsequent withdrawal can be made from the card balance. This is advantageous in that the customer can make the best use of his bank deposit with the cash dispensing machine operating on the basis of either off-line or on-line transaction schemes within the framework of the deposit the customer can withdraw.

Referring still to FIG. 6, since the purchase amount is withdrawn from the card balance during the off-line transaction scheme, it is quite natural that the maximum purchase amount is greater than the card balance. On the other hand, during the on-line transaction scheme, the purchase amount is subtracted from the card balance only when and after the ordinary deposit balance has become zero and, therefore, there is the possibility that the maximum purchase amount is smaller than the card balance. Naturally, that the maximum purchase amount is smaller than the card balance is an error.

In such case, comparison is made as to the difference between the ordinary deposit balance and the card available amount. The card available amount is defined as a balance between the maximum purchase limit and the card balance and is stored at a predetermined address in the principle memory section of the central data processor 2.

Where the ordinary deposit balance is equal to or greater than the card available amount, the card available amount is subtracted from the ordinary deposit balance and the ordinary deposit balance stored in the file is updated and, simultaneously therewith, the ordinary deposit balance in the file is updated with the card available amount added to the exclusive balance. However, this procedure is carried out for the purpose that, where the card available amount, which has been subtracted from the exclusive balance upon the batch operation during the off-line transaction scheme, the exclusive balance is updated to read an amount equal to the maximum purchase limit and, where the batch operation has not yet been carried out, the exclusive balance can be updated subsequently to read an amount equal to the maximum purchase limit. In this example, since the sum of purchase amounts which have been withdrawn within the framework of the maximum purchase limit is subtracted from the ordinary bank deposit, the card balance is updated to read an amount equal to the maximum purchase limit. Thereafter, the procedure is returned back to the step #5 shown in FIG. 6.

On the contrary thereto, where the ordinary deposit balance is smaller than the card available amount, this means that the ordinary deposit balance cannot deal with the sum of the purchase amounts which have been withdrawn within the framework of the maximum purchase limit. In this case, an amount which has been withdrawn in excess of the ordinary deposit balance is deemed as a credit loan, namely, Credit Loan = Card Available Amount − Ordinary Deposit Balance.

Thereafter, the ordinary deposit stored in the file is zeroed and the exclusive balance is updated to read an amount equal to the difference between the sum of the exclusive balance plus the card available amount and the credit loan. The card balance becomes equal to the difference between the maximum purchase limit and the credit loan. Then, the procedure proceeds to the step #5.

Subsequently, the balance quotation bit contained in the transmitted data is checked. In the case of the balance quotation, the data is compiled in the form as transmitted and then sent back to the cash dispensing machine 9. However, since the card balance is updated even in this case, the customer can make the best use of his credit card at the time he is going to make a transaction in the future during the off-line transaction scheme. In other words, the possibility can be avoided that he cannot withdraw money because of the insufficient card balance.

In the case where the balance quotation is not made, that is, in the case where money withdrawal is made, comparison is first made between the purchase amount and the ordinary deposit balance. If the ordinary deposit balance is sufficient, the purchase amount is automatically subtracted therefrom.

However, if the purchase amount is equal to or smaller than the ordinary deposit balance, the purchase amount is subtracted from the ordinary deposit balance stored in the file and a new balance is updated in the file while appropriate data are transmitted to the cash dispensing machine 9 to dispense the purchase amount.

On the contrary thereto, if the purchase amount is greater than the ordinary deposit balance, since the ordinary deposit balance cannot satisfy the customer's requirement, the purchase amount is compared with a total balance which is the sum of the ordinary deposit balance and the card balance. It is to be noted that the card balance referred to above is the one which has been updated. If the result of such comparison proves that the purchase amount is greater than the total balance, the customer's requirement cannot be accommodated and, therefore, withdrawal of the purchase amount cannot be made. In this case, an insolvency bit contained in the data to be transmitted to the cash dispensing machine is set, said data being then transmitted to the cash dispensing machine.

On the other hand, if the purchase amount is equal to or smaller than the total balance, an amount which cannot be subtracted from the ordinary deposit balance is subtracted from the card balance.

Subtracted Balance = Purchase Amount − Ordinary Deposit Balance.

The above subtracted balance is an amount from which the purchase amount cannot be withdrawn even if the ordinary deposit balance is zeroed and, therefore, must be subtracted from the updated card balance. In other words, the ordinary deposit balance stored in the file is zeroed, and the exclusive balance and the card balance are, after the subtracted balance has been subtracted from each of the exclusive balance and the card balance, compiled into the data which are then transmitted to the cash dispensing machine 9.

The cash dispensing machine 9, after having received the above described data and subsequently performed checking about the contents of the data (this checking step being not shown in FIG. 5), encodes the received data. If the encoded data show that the balance quotation has been made, the card balance which has been updated at the center 1 is displayed through the digital input display 15 while the credit card is returned to the customer. On the other hand, if the encoded data show that cash dispensing is required, the insolvency bit as described above is examined and, in the event that the purchase amount cannot be dispensed, this fact is displayed through the handling procedure display 11 while the credit card is returned to the customer, thereby completing the transaction. However, if the purchase amount can be dispensed, issuance of the sale slip, return of the credit card and dispensing of bank notes are carried out. This is a similar procedure which takes place during the off-line transaction scheme. In the case of the on-line transaction scheme, no transaction data need be recorded, but the transaction data remain recorded since a journal is printed simultaneously with the issuance of the sale slip.

As hereinbefore described, the present invention is such that, since the card balance is updated when a balance quotation is made during an on-line transaction scheme or when no purchase amount can be withdrawn, there is no possibility that, when the customer intends to subsequently withdraw a purchase amount during an off-line transaction scheme, the purchase amount cannot be dispensed because of the insufficient card balance.

While the present invention has fully been described in connection with the transaction system utilizing the cash dispensing machine, the transaction can utilize the cash depositing machine which will now be described with reference to FIG. 8. It is to be noted that the process steps performed by the cash depositing machine are shown not only in FIG. 8, which is divided into FIGS. 8(a) to (c) for the purpose of drawing drafting, but also in FIG. 7.

Figure 8:
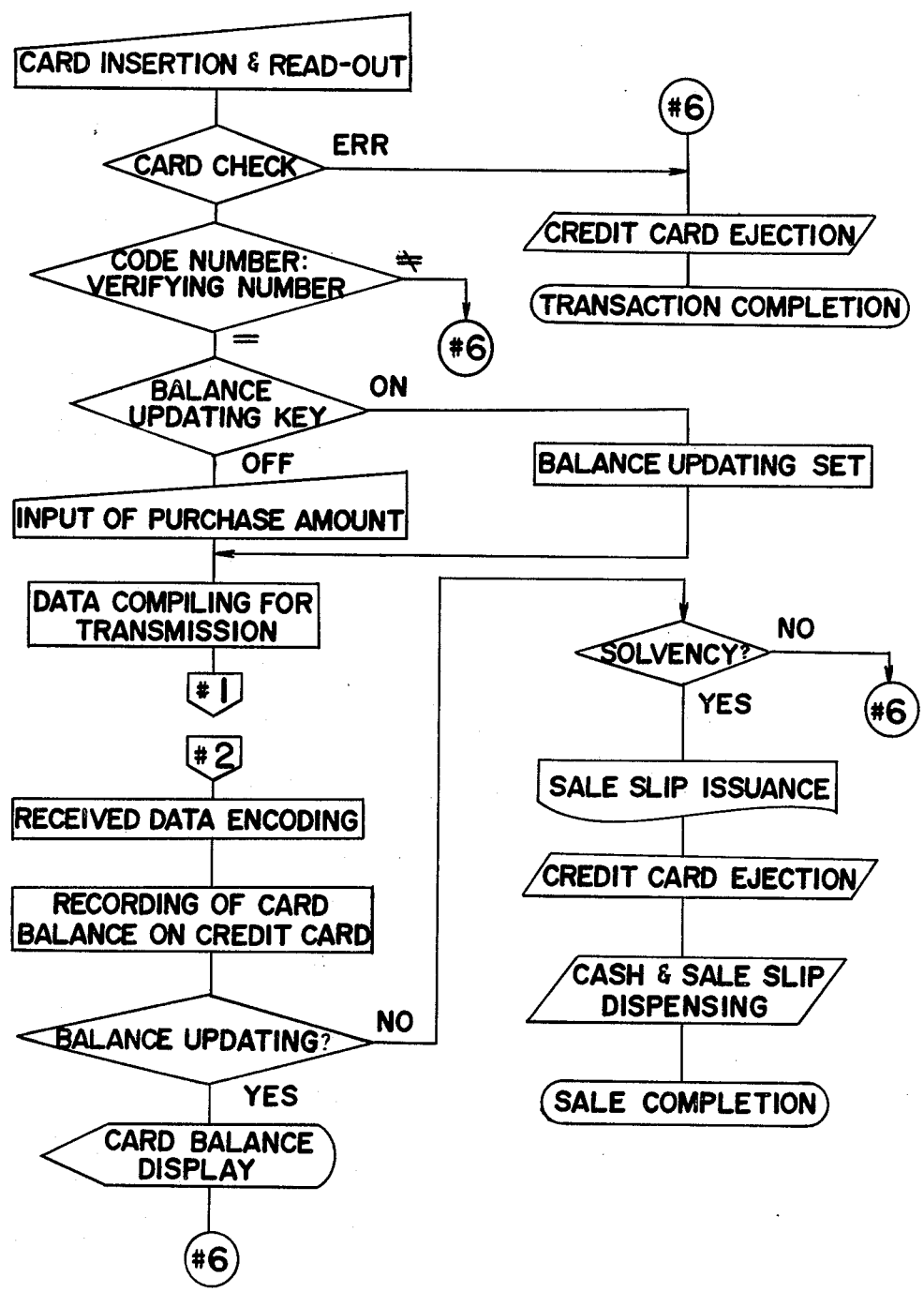
FIG. 8 is a program chart showing process steps performed by a money depositing machine during on-line transaction, FIG. 8 being divided into FIGS. 8(a) to (c).
Figure 8:
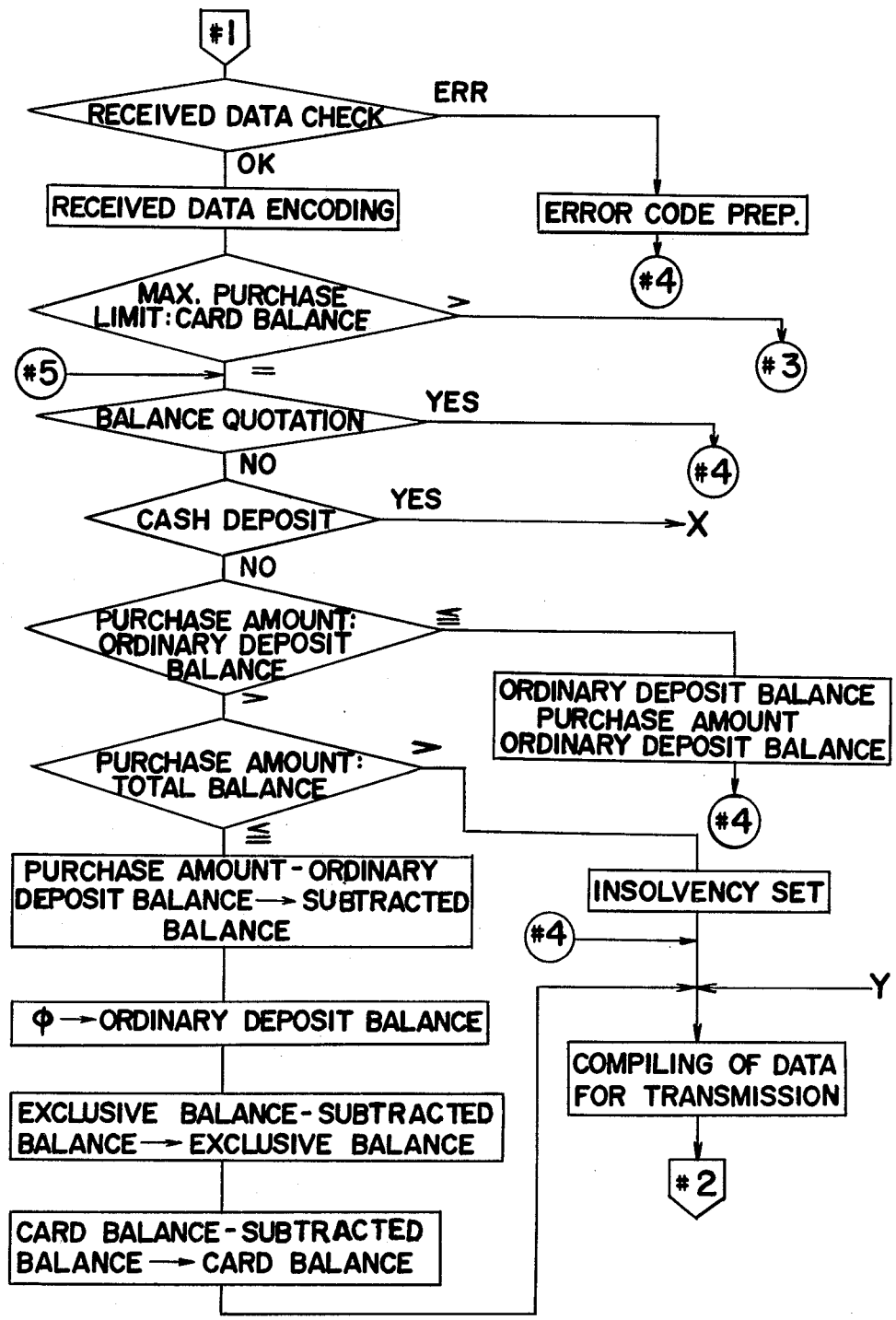
Figure 8:
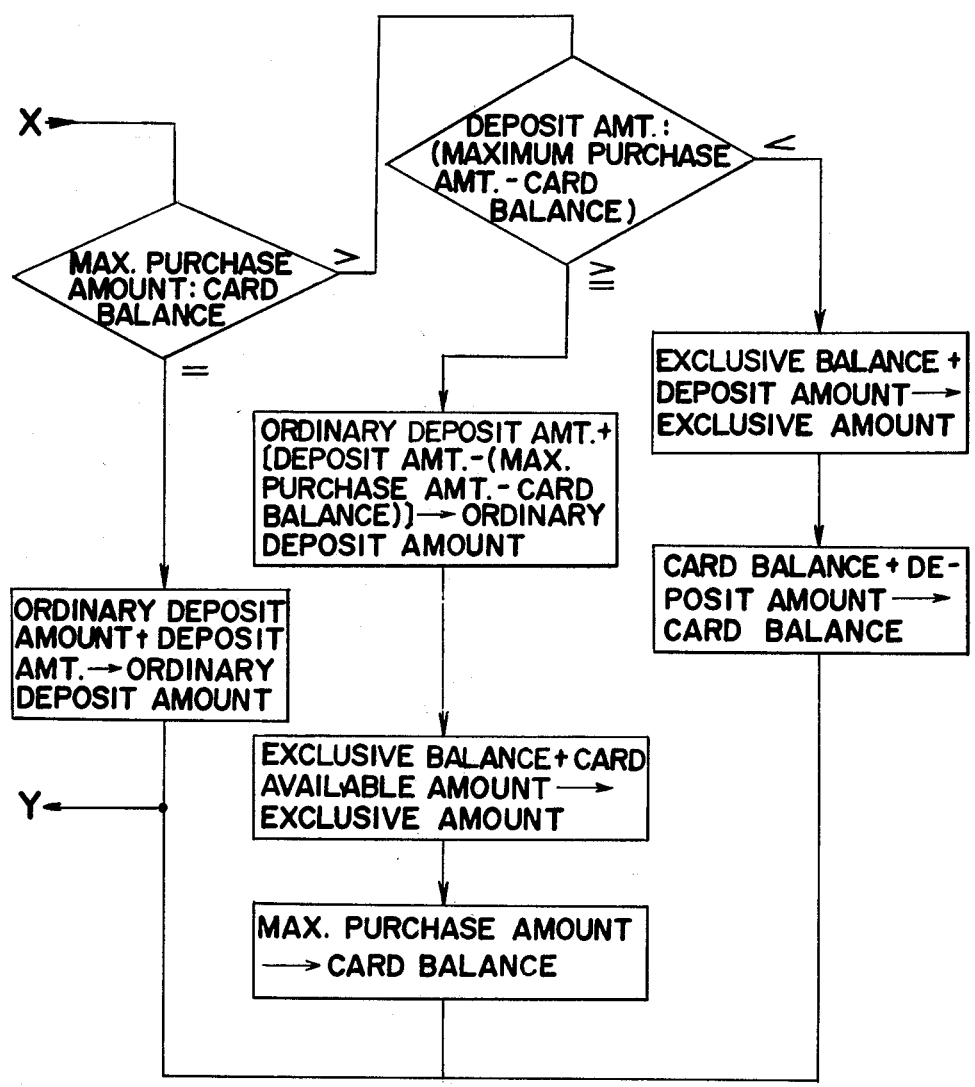

While most process steps are substantially identical with that shown in FIG. 6, four keys, which are respectively indicative of cash dispensing, cash depositing, balance quotation and balance updating, are necessary to render the cash depositing machine to operate in accordance with the program shown in FIG. 8.

Comparing FIGS. 6(a) and (b) with FIGS. 8(a) and (b), it will readily be seen that the step of "BALANCE QUOTATION KEY?" and the step of "BALANCE QUOTATION SET" shown in FIG. 6(a) are respectively replaced with the step of "BALANCE UPDATING KEY?" and the step of "BALANCE UPDATING SET" while the process steps shown in FIG. 8(c) are added together with the step of "CASH DEPOSIT?" as shown in FIG. 8(b).

Because of the similarlity between the program shown in FIGS. 6(a) and (b) and that in FIGS. 8(a) and (b), only the program shown in FIG. 8(c) will now be described.

Assuming that a certain amount of money (hereinafter referred to as deposit amount) is deposited into the cash depositing machine (not shown) with the cash deposit key depressed, the maximum purchase amount is compared with the card balance. If the former is equal to the latter, the ordinary deposit balance is recorded to read the sum of the ordinary balance and the deposit amount, the newly recorded ordinary deposit balance being compiled into the data to be transmitted. On the other hand if the former is smaller than the latter, the deposit amount is compared with the difference between the maximum purchase amount and the card balance.

If the deposit amount is equal to or greater than the difference between the maximum purchase amount and the card balance, the ordinary deposit balance becomes the sum of the previous ordinary deposit balance and the difference between the deposit amount and the difference between the maximum purchase amount and the card balance. Therefore, the exclusive balance becomes the sum of the previous exclusive balance and the card available amount and subsequently the card balance is rewritten to read the maximum purchase amount, which is in turn compiled into the data to be transmitted. On the other hand, if the former is smaller than the above described difference, the exclusive balance becomes the sum of the previous exclusive balance and the deposit amount and the card balance is rewritten to read the sum of the card balance and the deposit amount, which is in turn compiled into the data to be transmitted.

In this way, where the cash depositing machine is employed for the transaction processor, it is necessary that the card balance and the ordinary deposit balance is again updated depending upon the amount of money deposited, that is, the deposit amount.

While the present invention has fully been described, it is to be noted that various changes and modifications are apparent to those skilled in the art. Such changes and modifications are to be understood as included within the true scope of the present invention unless they depart therefrom.

What is claimed:

1. In a transaction system which comprises a card having a card balance recorded therein, said card balance being set to a predetermined value when an on-line transaction is effected and also being subsequently updated each time an on-line transaction is effected, at least one terminal transaction processor operable on the basis of on-line and off-line computer scheme, said terminal transaction processor being adapted to be operated by an individual having said card, and a center connected with the terminal transaction processor through an on-line channel and having a file for recording thereon data corresponding to the card, said center being capable of recording on the card an ordinary deposit balance owned by the individual having the card, one or both of said card and said file having recorded therein a maximum purchase amount with which the individual having the card can transact during the off-line transaction scheme, the improvement which comprises a card balance updating means for updating the card balance and the ordinary deposit balance during the on-line transaction scheme as a result of comparison, performed prior to the intended transaction, between the card balance and the maximum purchase amount, whereby cash can be dispensed to the individual during the off-line transaction scheme within the framework of the maximum purchase amount even after the operation by the individual during the on-line transaction scheme involving no cash transaction.

2. A transaction system as claimed in claim 1, further comprising human-manipulatable balance quoting key means for operating said card balance updating means to perform said updating.

3. A transaction system as claimed in claim 1, further comprising human-manipulatable purchase amount key means for operating said card balance updating means to perform said updating.

4. A transaction system as claimed in claim 1, further comprising human-manipulatable deposit amount key means for operating said card balance updating means to perform said updating.

5. A transaction system as claimed in claim 1, further comprising human-manipulatable card balance updating key means for operating said card balance updating means to perform said updating.

6. A transaction system as claimed in claim 1, wherein said transaction is a withdrawal of money or a deposit of money and wherein the card balance updated by the card balance updating means can be again updated upon said transaction.

7. A transaction system as claimed in claim 1, wherein said card balance updating means, when the maximum purchase amount is greater than the card balance, updates the card balance by subtracting from the ordinary deposit balance an amount of money necessary to equalize the card balance to the maximum purchase amount.

8. A transaction system as claimed in claim 1, wherein said file has a record of the exclusive balance which is equal to the card balance during the on-line transaction scheme.

9. A transaction system as claimed in claim 1, further comprising comparator means for comparing, prior to the intended transaction, said card balance and said maximum purchase amount.

* * * * *